United States Patent [19]
Bradford et al.

[11] Patent Number: 5,582,001
[45] Date of Patent: Dec. 10, 1996

[54] HYBRID ROCKET COMBUSTION ENHANCEMENT

[76] Inventors: Michael D. Bradford, 4896 Kenneth Ave., Santa Maria, Calif. 93455; Roy J. Kniffen, Jr., 934 Sharon La., #1, Ventura, Calif. 93001; Bevin C. McKinney, 252 N. Crimea, Ventura, Calif. 93004

[21] Appl. No.: 398,140

[22] Filed: Aug. 24, 1989

[51] Int. Cl.⁶ .................................................. F02K 9/28
[52] U.S. Cl. .................... 60/251; 60/207; 60/211; 60/219; 60/250
[58] Field of Search ............................ 60/251, 207, 211, 60/219, 250

[56] References Cited

U.S. PATENT DOCUMENTS

| | | | |
|---|---|---|---|
| 3,136,119 | 6/1964 | Avery | 60/251 |
| 3,302,403 | 2/1967 | Kryzycki et al. | 60/251 |
| 3,354,647 | 11/1967 | Aycock | 60/251 |
| 3,423,943 | 2/1967 | Stark | 60/250 |
| 3,782,112 | 1/1974 | Muzzy | 60/251 |
| 4,038,321 | 7/1977 | Thatcher et al. | 423/194 |
| 4,176,637 | 12/1979 | Cole | 123/537 |
| 4,723,736 | 2/1988 | Rider | 244/172 |
| 4,771,601 | 9/1988 | Spies | 60/259 |
| 4,880,185 | 11/1989 | Apfel | 244/135 B |

*Primary Examiner*—Charles T. Jordan
*Assistant Examiner*—Anthony R. Chi
*Attorney, Agent, or Firm*—Nixon & Vanderhye P.C.

[57] ABSTRACT

The combustion of a hybrid engine is improved by continuously injecting into a precombustion chamber a hypergolic fluid such as triethyl aluminum which exothermically reacts with and vaporizes the oxidizer such as liquid oxygen. The prevaporized oxidizer evenly combusts the solid propellant grain to develop thrust.

19 Claims, 3 Drawing Sheets

HYBRID ROCKET COMBUSTION ENHANCEMENT

TECHNICAL FIELD

This invention relates to a propulsion system for use in lifting payloads into orbit and, more particularly, the present invention relates to improving the burning characteristics of a hybrid rocket.

BACKGROUND OF THE INVENTION

There is a demand for vehicles to lift payloads into space. Military, commercial and research interests have built satellites, and research experiments that are waiting to be launched into space. There is also a developing interest in stationing manufacturing plants in low earth orbit that will take advantage of absence of gravity and the pure vacuum of space. Space stations will require constant resupplying of raw materials and food and other supplies for the personnel present on the station.

Until recently almost all the U.S. launched payloads were lifted into space by means of the shuttle program. The shuttle was heavily subsidized which forced private enterprise to be non-competitive in cost of launch. NASA's space program was not able to fulfill its goals. In 1984 NASA was restricted from competing in the commercial launch field by the U.S. Commercial Space Launch Act.

Major aerospace companies returned to the commercial launch field with the Titan, Atlas and Delta. These rockets are designed for large payloads weighing up to 4,000 pounds. Since these rockets were designed for military applications they are as light as possible at the expense of cost.

Not all payloads are that heavy. There is a need to be able to place smaller payloads into low earth orbit at a reasonable cost. Large conventional rockets use either a solid propellant or a liquid fuel. Solid propellants are formed from a combustible binder such as a polyurethane containing a dispersion of oxidizer salt such as ammonium perchlorate and metal particles such as aluminum. Once a solid propellant is ignited it burns completely until all the fuel is consumed. There is no way to moderate or control the thrust or rate of burn. There are problems with burning instability developing within the motor and with separation of the solid motor element from the motor casing. Solid propellant rockets are very expensive. NASA mainly uses solid propellant rocket motors. Liquid rocket motors do offer the advantage of control of the rate of burn. However, liquid rockets utilize highly reactive hypergolic liquid fuel and liquid oxidizer. The fuel and oxidizer are usually stored outside of the engine until immediately before launch. Liquid motors require complex, expensive, heavy metering, valving and control mechanisms. Liquid rockets are hazardous and can destruct catastrophically.

STATEMENT OF PRIOR ART

A hybrid rocket engine is a cross between a solid propellant rocket and a liquid propellant rocket. A hydrid rocket utilizes a liquid oxidizer to burn a solid propellant element. An inverse hybrid rocket applies a combustible liquid to a solid oxidizer. The hybrid rock propellant grain can be ignited by an igniter such as an electrically generated spark, by initial injection of an ignition fluid which exothermically reacts with the liquid oxidizer.

A hybrid engine provides the following basic advantages: (1) the complete separation of fuel from the principal oxidizer, eliminating the potential for uncontrolled mixing, (2) the capability to use an optimum combination of propellant ingredients regardless of whether these are solid or liquid, and (3) the capability to easily stop and restart the engine. Hybrid engines have the potential for low cost, reliability and safety.

In addition to its on-off capability, the engine is easily throttleable since there is only one liquid component. Since the fuel grains need not contain any oxidizer, they are easily produced under less hazardous conditions. The engine is quite less sensitive to cracks and flaws in the grains since there is no possibility for the combustible fuel to separate from the solid oxidizer or metal particles. The fuel element can be stored for long periods under wide temperature variations.

The U.S. Navy and Air Force have investigated hybrid rockets but neither have been able to make hybrid rockets work. Both parties were attempting to develop high energy rocket engines. They used exotic additives such as adding some of the oxidizer to the solid element. It was difficult to obtain even burning along the length of the fuel element.

High thrust rocket propulsion systems must perform smoothly at the given design levels. However, high energy rocket propulsion systems sometimes fail to maintain the necessary pressures in a constant fashion. Observed deficiencies include low burning rates, mixture ratio shift with throttling and poor fuel utilization, which result in loss of performance and unpredictable decay in thrust level, particularly near burnout. One of the causes of erratic performance is the flow of unvaporized liquid oxidizer, which disrupts the normally stable boundary layer combustion process. Ideally, during combustion a combustion zone is formed in the boundary layer at the interface of the vaporizing fuel flow and the vaporized oxidizer, within the momentum boundary layer and is the source of the heat flow to the surface of the solid fuel to maintain fuel vaporization. As unvaporized liquid oxidizer is distributed along the surface of the solid propellant (grain), the temperature of the forward reaction mixture is reduced, thus the efficient combustion area is developed toward the aft end of the rocket. As the pressure differences within the combustion area increase, the hot reaction products move forward into the area of lower pressure and temperature, then aft again, producing a series of low frequency oscillations along the length of the grain. This results in erratic combustion and unstable thrust. Thus, it is essential for stable hybrid rocket engine performance that there is a consistent boundary layer over the entire solid propellant.

In the last forty year, much attention has been paid to the injection phase of liquid propellants in rocket engines. Many injectors have been developed and details of successful injector designs are available in the scientific and patent literature. However, the design of injectors is still empirical and it is difficult to assure successful and consistent combustion and pressure levels. It is known that oxidizer injection can give smooth combustion during engine start and stop periods as well as during steady-stage operation. However, any accumulation of unburned oxidizer in the combustion chamber must be prevented to avoid destructive chamber pressure surges. Combustion performance is influenced by propellant mass distribution, temperature and degree of mixing of injected reaction mixtures, in either the liquid or gaseous phase, or both, droplet atomization and vaporization at varying pressure drops, rate of heat input and the chemical reaction rates. The more thorough the mixing and uniform the distribution of the two reactants, the more rapidly will the combustion products reach the equilibrium combustion necessary for optimum performance.

It has been attempted to add aluminum powder to the solid fuel element to control instability in the burning of the fuel. The aluminum is oxidized to aluminum oxide particles which stabilize the boundary layer and dampen vibrations. However, the fuel is more energetic and explosive, the aluminum oxide particles are abrasive and erode the nozzle and the output gas is polluted with the aluminum oxide particles.

Altman et al. (U.S. Pat. No. 3,234,729) adds a non-hypergolic additive to the liquid oxidizer or liquid fuel in an inverse hybrid rocket that exothermally reacts with the liquid fuel or oxidizer material after ignition in the motor. The mixture is the injected into the combustion chamber. Hypergolic additives are mixed with the liquid component just as they are introduced into the combustion zone.

Injection of the additive into the combustion zone or of the mixture of the additive with the liquid oxidizer does not provide complete vaporization of the oxidizer. This can result in unstable burning within the motor. Furthermore, use of non-hypergolic additives preferred by Altman et al. requires separate ignition or delayed ignition until after the mixture of additive and liquid oxidizer within the chamber.

Campbell (U.S. Pat. No. 3,116,599) discloses a pressure-regulated system for repeatedly restarting a hybrid rocket motor. Injection of ignition liquid is terminated once the motor develops pressure.

Greco (U.S. Pat. No. 3,323,308) discloses a constant flow, variable area injector for a hybrid rocket engine.

Francis et al. (U.S. Pat. No. 3,137,128) discloses a pump-fed liquid fuel engine in which the liquid fuel pump discharge pressure is utilized to activate the liquid oxidizer control valve.

Holzman (U.S. Pat. No. 4,424,679) uses a double refuse oxidizer valve to maintain constant thrust in a hybrid rocket motor.

Biddle (U.S. Pat. No. 4,527,389) discloses a hydroxyl-ammonium salt solution as a liquid oxidizer for a hybrid rocket motor.

STATEMENT OF THE INVENTION

The present invention enhances vaporization of propellant in a hybrid rocket engine. This provides even combustion and smooth and reliable engine performance. Another aspect of the invention is preventing unvaporized oxidizer from entering the combustion chamber. The prevaporized oxidizer does not extract any heat from the combustion chamber which would cool the combustion zone, thus leading to disruption of the boundary layer and unstable combustion. The flow of vaporized oxidizer into the combustion chamber does not result in a change in the volume of the combustion gas as would occur during vaporization of liquid oxidizer. Again, this contributes to steady operation of the hybrid engine.

The injector of the invention establishes and maintains combustion of oxidizer throughout the operation of the engine and provides more uniform temperature distribution in the precombustion-oxidizer vaporization zone of the rocket prior to the entry of the vaporized oxidizer into the combustion chamber of the hybrid rocket. The fuel grain burns evenly eliminating the low frequency harmonics typical of hybrid rocket engines.

These and many other features and advantages of the invention will become apparent as the invention becomes better understood by reference to the following detailed description when considered in conjunction with the accompanying drawings.

DETAILED DESCRIPTION OF THE DRAWINGS

DETAILED DESCRIPTION OF THE INVENTION

Figure 1:
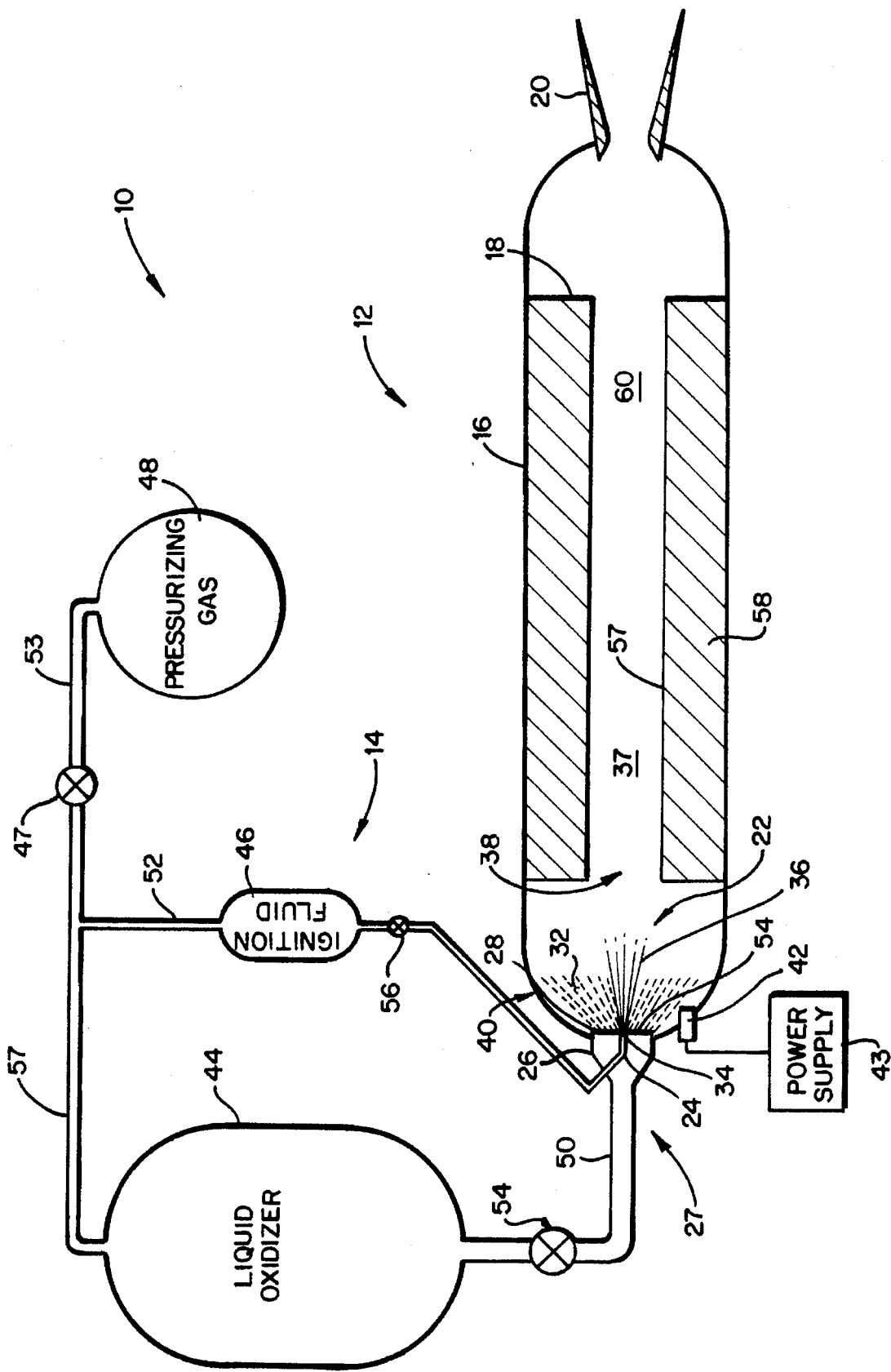
FIG. 1 is a schematic view of a hybrid rocket system in accordance with the invention.

The hybrid rocket engine system 10 shown in FIG. 1 generally includes a solid rocket motor 12 and liquid oxidizer and ignition fluid supply subsystem 14. The motor is formed of a casing 16 to which is bonded a solid propellant grain 18. A nozzle 20 is attached to the aft end of the motor. The forward end includes a precombustion chamber 22. A set of injector nozzles 24, 26 spray liquid oxidizer and an hypergolic fluid exothermally reactive with the liquid oxidizer into the precombustion chamber 22. The nozzles can have many configurations previously used in liquid rocket or hybrid rocket technology. The oxidant and hypergolic fluid are forced through injectors either in series or parallel with sufficient pressure to intermix, atomize and ignite its mixture. The preferred configuration shown in FIG. 1, is a coaxial injector in which the hypergolic fluid injector 24 is coaxially mounted within the spray head of an impingement-type oxidizer injector 26.

As the fluid oxidizer droplets 28 are propelled at an angle from the inwardly directed nozzles 26, the droplets impinge on each other and break into fine droplets 32. The hypergolic spray 34 emerging from the injector 24 ignites the fine droplets to form a precombustion flame 36 which continues to impinge on the oxidizer droplets until all the droplets are vaporized before the oxidizer enters the inlet 38 of the combustion chamber 39 of the propellant grain 18.

The propellant grain can be ignited by: (1) the hypergolic reaction between the solid propellant phase and the primary liquid oxidizer, (2) the solid propellant phase and the secondary, or ignition fluid, which is followed by the flow of the primary liquid oxidizer, or (3) by the reaction between the primary and secondary fluids, or by the use of a pyrotechnic device.

A pyrotechnic device 42 such as an electrical ignition spark plug can be inserted through the end wall 40 of the casing into the precombustion chamber 22 to provide ignition. The spark plug is connected to a power source 34. Another form of igniter is a pyrogen such as steel wool placed within the precombustion chamber 22. On contact with oxidizing agent such as oxygen, the pyrogen ignites the mixture.

The liquid components, oxidizer and ignition fluid are stored outside the motor in storage containers 44, 46, respectively. The liquids are forced through the nozzles of the injectors 24, 26 by being pumped or by being pressurized by a gas pressure source 48 such as a tank of inert gas. The tank 48 is connected to the storage container 44, 46 by fluid flow lines 51, 53 containing a valve 49. The lines 50, 52 connecting the storage containers 44, 46 to the coaxial injectors 24, 26 also contain flow regulation valves 54, 56.

The rocket engine is operated by pressurizing the oxidizer and ignition liquid containers 44, 46 by opening the outlet valve 47 of the inert gas pressurizing tank 48. The flow regulation valves 54, 56 on the outlet side of the storage tanks, 44, 46 are then regulated to produce a combustible mixture. The igniter 42 is operated to initiate combustion of the liquid mixture spray 34 and of the surface 57 of the solid grain 18. A controlled flow of high pressure, high temperature gas 60 moves down the grain 58 and accelerates as it moves through the nozzle 20 producing thrust.

The solid grain can be made of any material which is combustible by the liquid oxidizer. Generally, the solid grain is formed from a castable synthetic resin having a high content of hydrocarbon atoms. Suitable resins are polyethylene, polystyrene and synthetic rubbers such as butyl rubber, GRS (butadiene-styrene copolymer) and liquid butadiene prepolymers which can be reacted and cured to form elastomeric solid propellant gains. The grain is substantially pure resin. It need not contain metal particles nor oxidizer salt.

The liquid oxidizer can be any of the liquid materials previously used in liquid rockets or hybrid rocket motors. Preferred liquid oxidizers are hydrogen peroxide and liquid oxygen (LOX).

The hypergolic compositions may be selected from compounds having the general structural formulas shown below, wherein R, $R_1$ and $R_2$ are hydrogen or alkyl or alkoxyl radicals having from one to ten carbon atoms.

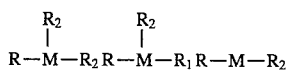

R, $R_1$ and $R_2$ may be hydrogen, branched, straight-chain or unsaturated alkyl radicals with or without a plurality of double bonds in any order. M may be aluminum, boron, magnesium, zinc, manganese, and others that appear in Groups IIB, IIIA, and IVA in the periodic table of the elements. In addition, these functional groups may be connected by oxygen to produce metallic ethoxides. The preferred substances are triethyl aluminum, trimethyl aluminum, triethyl boron, trimethyl boron, dimethyl zinc, diisobutyl aluminum hydride, triisobutyl aluminum, diethyl aluminum hydride, di-n-propyl aluminum hydride, tri-n-propyl aluminum, tri-n-butyl aluminum, tri-n-hexyl aluminum, and the like. These hypergolic substances are injected with the inflowing liquid oxidizer, and ignite it to initiate the necessary combustion in the sequence. In addition, continuous or repeated injections of these hypergolic compositions enhances vaporization of the liquid oxidant and, subsequently prevents the flow of liquid oxidizer onto the solid fuel, preventing disruption of the boundary layer combustion zone.

The hypergolic fluid is injected in an amount sufficient to vaporize all of the liquid oxygen. The flow rate can be readily calculated from the temperature of the liquid oxidizer and the heat of vaporization of the oxidizer and the flow rate of the oxidizer. For example, a hybrid engine using liquid oxygen and a trialkyl aluminum pyrogollic fluid, a flow rate of from about 0.1% by weight of the liquid oxidizer is sufficient to vaporize all the oxidizer. Flow rates higher than 5% by weight of the oxidizer are unnecessary and can lead to unstable burning. Usually the flow rate is from about 0.5 to 3% by weight of the oxidizer.

Figure 2:
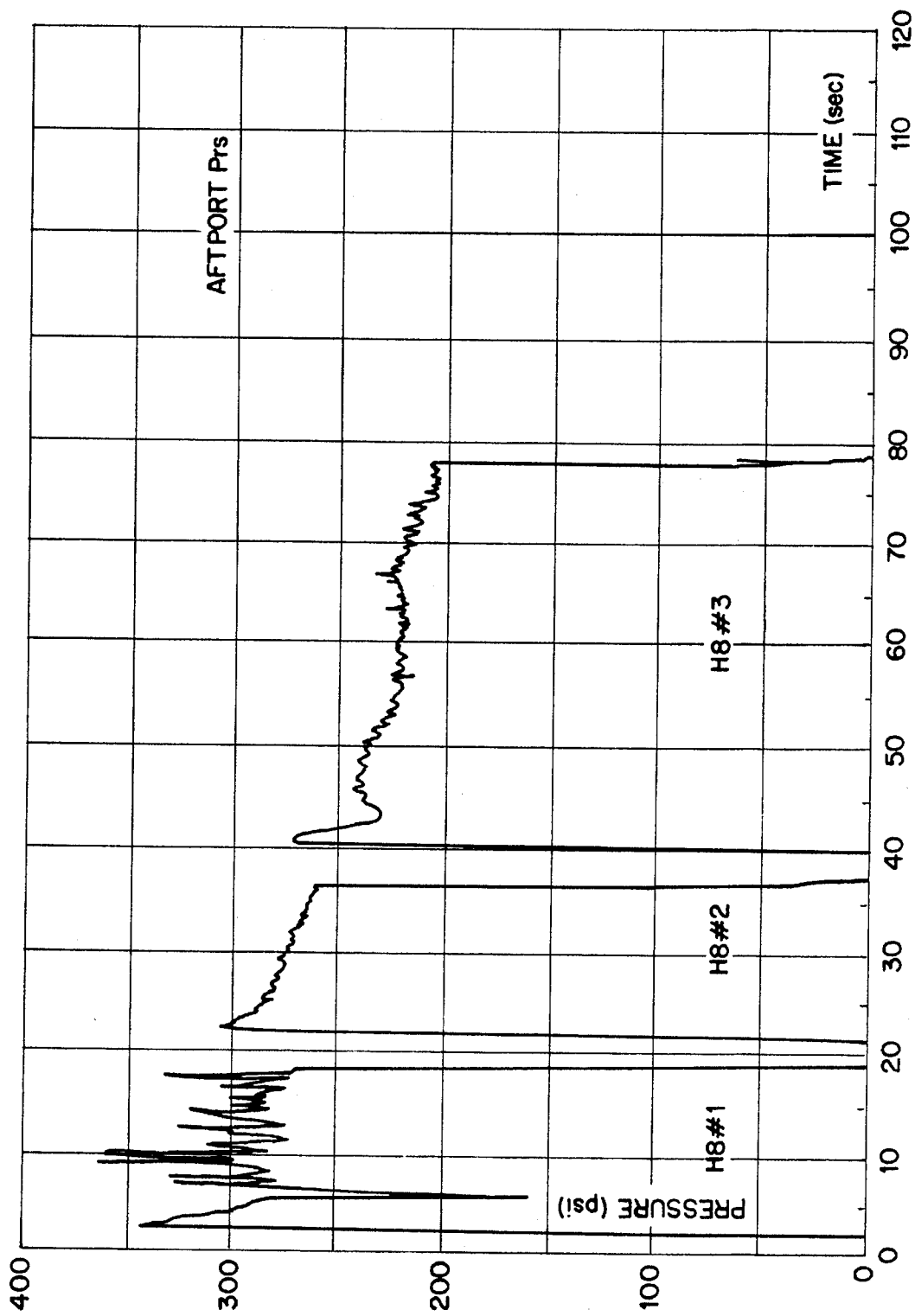
FIG. 2 is a set of 3 graphs showing the aftport pressure of short firings of three motors.

Specifically, the liquid oxidant and the hypergol are forced through injectors, either in series or parallel, with such pressure they are intermixed, atomized and are spontaneously ignited. FIG. 2 shows one type of series injector in which an integral part of this injector-atomizer, is another, coaxial, shower spray-type apparatus through which is fed triethyl aluminum from the hypergol tank with sufficient force so that it is atomized in turn, and is intimately mixed with the oxygen vapor to ignite it, producing a zone in which the LOX is vaporized to produce the initial deflagration necessary to volatilize the solid fuel. Further, this injector apparatus forces the reactants out into the mixing area with such efficiency that it heats and vaporizes all the liquid oxygen, thus preventing cold areas on the solid fuel and subsequent uneven combustion.

Hybrid engines were constructed incorporating a polybutadiene solid grain and utilizing a casing containing a precombustion zone as shown in FIG. 1. Liquid oxygen was utilized as the liquid oxidizer and triethyl aluminum (TEAL) as the hypergolic fluid. One engine (Example 1) was operated with TEAL only injected during initial start-ups. Two other engines (Example 2 and 3) were operated with the TEAL injected continuously, Example 4 was a test burn lasting 70 seconds with TEAL continuously injected.

FIG. 2 shows three short test firing; Example 1 shows the aftport pressure during a time when TEAL was not injected. Both Example 2 and Example 3 show the aftport pressure, under identical conditions, while TEAL was being injected. Example 1 shows the low frequency harmonics of hybrid rocket engines that have been reported in the literature while Example 2 and 3 show that said low frequency harmonics have been eliminated.

Figure 3:
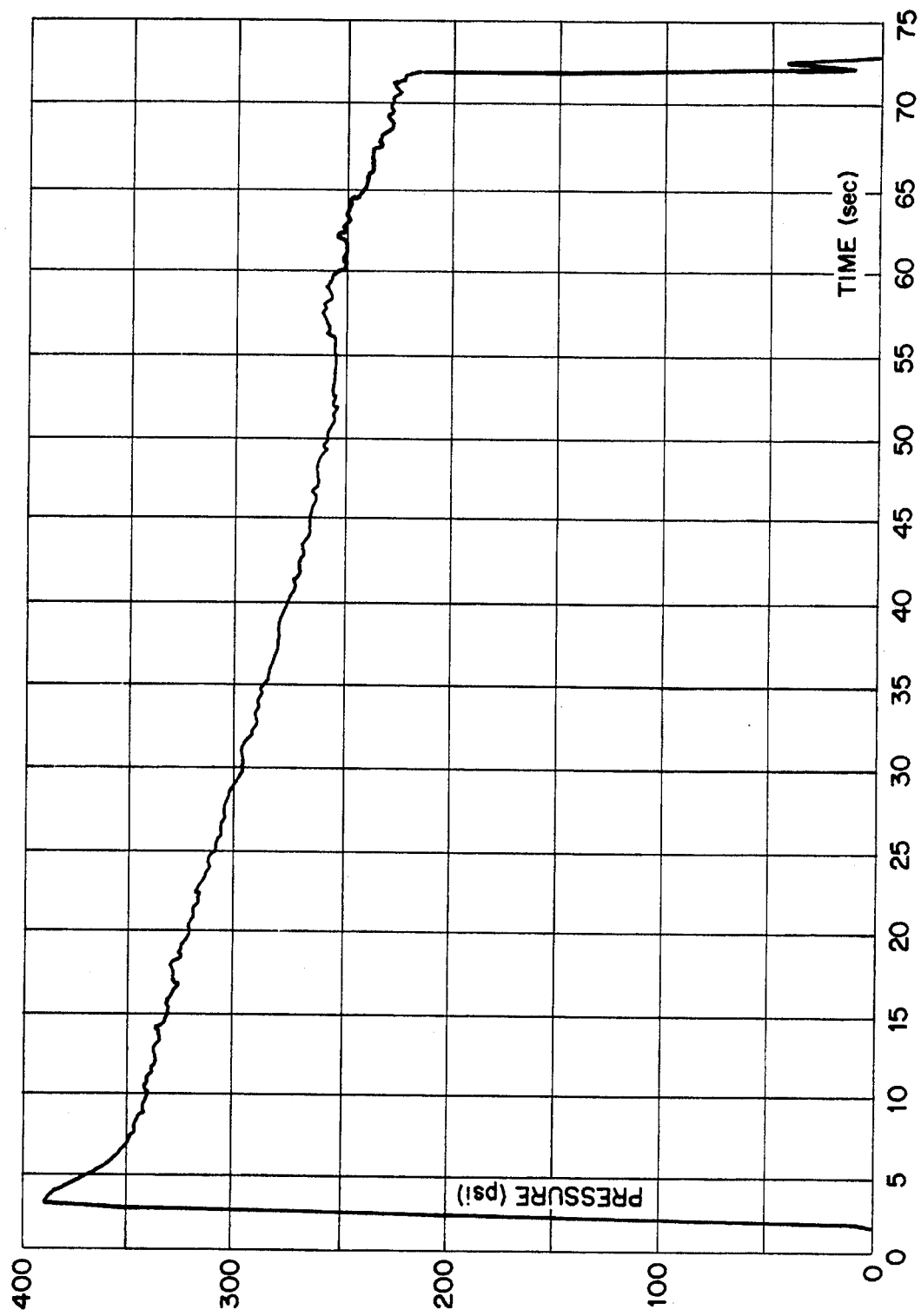
FIG. 3 shows the aftport pressure of a seventy record test firing of a hybrid rocket engine with injection of hypergolic liquid continuously throughout the burn.

FIG. 3 shows one burn test lasting 70 seconds, with TEAL continuously injected through the burn. Example 4 shows that the aftport pressure has remained steady, with no low frequency harmonics being present during the burn.

We claim:

1. A method of enhancing the combustion of a hybrid rocket comprising the steps of:

injecting liquid oxidizer into the precombustion chamber of a hybrid rocket engine;

adding to the injected oxidizer a second liquid exothermally reactive with the oxidizer in an amount sufficient to vaporize substantially all of said oxidizer within said chamber;

exothermally reacting said oxidizer and liquid to form a gas containing vaporized oxidizer;

flowing said gas adjacent the surface of a solid propellant grain; and reacting the oxidizer and surface of the grain to produce combustion gas; and expelling the combustion gases from the engine to develop thrust.

2. A method according to claim 1 in which the liquid oxidizer is injected into the chamber as a fine spray of droplets.

3. A method according to claim 2 in which the second fluid is injected into the center of the oxidizer spray.

4. A method according to claim 3 in which the oxidizer droplets are injected from an impingemented type of injector.

5. A method according to claim 1 in which the propellant grain is a synthetic, hydrocarbon resin.

6. A method according to claim 5 in which the resin is selected from holyethylene, polystyrene or polybutadiene.

7. A method according to claim 1 in which the liquid oxidizer is liquid oxygen.

8. A method according to claim 1 in which the second fluid is a hypergolic fluid.

9. A method according to claim 8 in which the second fluid is continuously injected into the chamber throughout the combustion of the solid propellant grain.

10. A method according to claim 9 in which the second fluid is intermittently injected into the chamber throughout the combustion of the solid propellant grain.

11. A method according to claim 1 in which the flow rate of the injected second fluid is at least 0.1% by weight of the flow rate of the liquid oxidizer.

12. A method according to claim 11 in which said flow rate is from 0.5 to 3 percent by weight the flow rate of the liquid oxidizer.

13. A method according to claim 12 in which the second fluid is a metal alkyl or metal alkoxide of a Group IIB, IIIA or IVA metal.

14. A method according to claim 13 in which the second fluid is a compound selected from the formula:

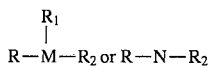

where R, $R^1$ and $R^2$ are individually selected from H, alkyl of 1–8 carbon atoms or alkylene of 1–8 carbon atoms and M is selected from aluminum, boron, magnesium, zinc, manganese.

15. A method according to claim 14 in which the second fluid consists of a compound selected from triethyl aluminum, trimethyl aluminum, triethyl boron, trimethyl boron, dimethyl zinc, diisolbutyl aluminum hydride, triisobutyl aluminum, diethyl aluminum hybrid, di-n-propyl aluminum hybrid, tri-n-propyl aluminum, tri-n-butyl aluminum or tri-n-hexyl aluminum.

16. A method according to claim 15 in which the second fluid consists of triethyl aluminum.

17. A hybrid rocket engine comprising in combination:

a motor casing having an aft end and a fore end;

a hollow-solid propellant grain attached to the casing defining a combustion zone;

a nozzle attached to the aft end of the casing;

a closure member attached to the fore end of the casing defining a precombustion chamber;

first means for injecting liquid oxidizer into the precombustion chamber; and second means for injecting into the precombustion chamber throughout the combustion of the grain a second fluid exothermically reactive with the liquid oxidizer.

18. An engine according to claim 15 in which the first and second means are combined into a coaxial injector.

19. A method according to claim 18 in which the second injection system engine further includes second liquid storage means and means for pumping the second liquid from the storage means to the central injector of the coaxial injector.

* * * * *